United States Patent
Kirschner

(10) Patent No.: US 7,140,579 B2
(45) Date of Patent: Nov. 28, 2006

(54) SWAY BRACE CLAMP

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 10/829,463

(22) Filed: Apr. 20, 2004

(65) Prior Publication Data

US 2005/0230569 A1    Oct. 20, 2005

(51) Int. Cl.
*F16L 3/08* (2006.01)
(52) U.S. Cl. .................. 248/74.1; 248/230.5
(58) Field of Classification Search ........... 248/74.1, 248/49, 74.4, 230.1, 230.5, 227.4, 227.3
See application file for complete search history.

(56) References Cited

U.S. PATENT DOCUMENTS

| | | | | |
|---|---|---|---|---|
| 1,025,243 A | * | 5/1912 | Carpenter et al. ............ 248/58 |
| 2,335,833 A | * | 11/1943 | Wood ......................... 248/542 |
| 3,570,794 A | * | 3/1971 | Kirschner ................. 248/74.4 |
| 4,078,752 A | * | 3/1978 | Kindorf ........................ 248/62 |
| 4,697,770 A | | 10/1987 | Kirschner .................... 248/62 |
| 4,767,087 A | * | 8/1988 | Combu ........................ 248/62 |
| 4,951,902 A | * | 8/1990 | Hardtke ..................... 248/74.1 |
| 4,998,691 A | * | 3/1991 | Brown ....................... 248/74.1 |
| 5,004,193 A | | 4/1991 | Kirschner .................... 248/59 |
| 5,007,603 A | | 4/1991 | Kirschner .................... 248/59 |
| 5,145,132 A | | 9/1992 | Kirschner .................. 248/291 |
| 5,161,836 A | * | 11/1992 | McKinnon .................. 285/373 |
| 5,295,646 A | * | 3/1994 | Roth ........................... 248/58 |
| 5,565,175 A | * | 10/1996 | Hottovy et al. ............ 422/132 |
| 6,099,191 A | * | 8/2000 | Werner ........................ 403/24 |
| 6,131,859 A | * | 10/2000 | Giuliano ...................... 248/62 |
| 6,334,285 B1 | | 1/2002 | Kirschner .................... 52/702 |
| 6,464,422 B1 | | 10/2002 | Kirschner .................... 403/24 |
| 6,508,441 B1 | | 1/2003 | Kirschner .................... 248/62 |
| 6,629,678 B1 | | 10/2003 | Kirschner ................. 248/228.6 |

OTHER PUBLICATIONS

U.S. Appl. No. 10/668,116, filed Sep. 22, 2003.
AFCON Product Sheet "400 Riser Clamp Iron Pipe"—published prior to Apr. 20, 2003 in the U.S.

* cited by examiner

*Primary Examiner*—Anita M. King
(74) *Attorney, Agent, or Firm*—Connolly Bove Lodge & Hutz LLP

(57) ABSTRACT

A sway brace clamp supporting pipe of specified outside diameter with mill tolerance includes two elongate bars with each bar having an arcuate section and two straight sections on either end of the arcuate section. Each straight section has an attachment surface which can be placed against the corresponding surface on the other elongate bar. The fasteners retain the two bars together at the attachment surfaces. The arcuate section of each bar is such that when employed with the attachment surfaces of the two bars engaged about a pipe, the center of curvature of each section is substantially co-incident with the center of curvature of the other section. In a relaxed state, each center of curvature extends a bit beyond the attachment surface in order that a predictable amount of mounting force can be applied by the clamp. A sway brace of known design mounts the clamp to a building structure.

10 Claims, 1 Drawing Sheet

SWAY BRACE CLAMP

BACKGROUND OF THE INVENTION

The field of the present invention is bracing hardware for use in building structures for utility piping.

Building codes, as well as competent construction practice, require the securing of fluid lines and other utilities to the structure of the building to brace such lines against damaging movement resulting from seismic disturbances. Sway braces have been designed for securing numerous types of fluid supply piping. An example of such secured piping is fire control water sprinkler distribution pipes. When sprinkler systems are used in buildings, it is required that the water distribution pipes be adequately braced, so that, in the event of an earthquake, the pipes will not unduly sway relative to adjacent portions of the building and separate or produce excessive leakage at the pipe joints.

Various types of sway brace structures have been developed for the foregoing purpose. Examples of such brace designs are to be found in U.S. Pat. Nos. 3,570,794; 4,697,770; and 6,508,441. Further, a number of devices may be employed for mounting such bracing to a structure. Examples are found in U.S. Pat. Nos. 5,004,193; 5,007,603; 5,145,132; 6,334,285; 6,464,422; and 6,629,678. The disclosures of the aforementioned nine patents are incorporated herein by reference.

Pipe used for utility purposes in construction, such as for fire sprinkler systems, comes in certain sizes and materials. These specified pipe sizes have nominal outside diameters which vary within specific mill tolerances. Such nominal sizes and the associated mill tolerances can differ based on pipe material such as steel, cooper and plastic and on pipe nominal diameter. Hardware applied to such utility pipe of these various specified sizes is frequently designed specifically for a specified size and identified as such. The design of such hardware contemplates the nominal dimensions and, where necessary, the tolerances thereof. Thus, there is a specific relationship and fit achieved by such hardware which is defined by the nominal dimensions within tolerance limits of any given specified utility pipe size for which the hardware is made.

FIG. 1 illustrates a prior art pipe clamp. The clamp is illustrated in its employed state with two bars 10 each defining a first straight section 12, an arcuate section 14 and a second straight section 16. Fasteners 18 hold the two bars 10 together. However, the profile of the arcuate section 14 is designed to position each bar 10 about a pipe such that the straight sections 12 and 16 are not brought together when tightened about a pipe. Wide variations in clamping force can be experienced depending on the amount of tightening applied to the fasteners.

SUMMARY OF THE INVENTION

The present invention is directed to a sway brace clamp for piping as well as sway brace assemblies employing the clamp. The clamp being for clamping pipe of specified outside diameter with mill tolerance includes two elongate bars with fasteners holding the bars together. Each bar includes an arcuate section, a first straight section on one end of the arcuate section and a second straight section on the other end of the arcuate section. The first and second straight sections of each bar define attachment surfaces lying in a common attachment plane. Through holes in the first and second straight sections accommodate fasteners.

In a first separate aspect of the present invention, the attachment surfaces of the straight sections of the two bars can be against one another. In this configuration, each of the arcuate sections of the two elongate bars defines a center of curvature which lies substantially in the common attachment plane of the respective bar when clamped about the pipe with the attachment surfaces of the first straight sections against the attachment surfaces of the second straight sections, respectively.

In a second separate aspect of the present invention, the attachment surfaces of the straight sections of the two bars can be against one another. In this configuration, each of the arcuate sections of the two elongate bars defines a maximum distance perpendicular to the attachment plane between the attachment plane and the concave side of the arcuate section for each elongate bar which is less than the nominal outside radius minus the negative radial mill tolerance of the pipe of specified outside diameter when the bar is unstressed to provide a designed clamping force imposed on the pipe of specified outside diameter with the attachment surfaces of the two bars positioned against one another about the pipe, respectively. These relationships provide designed clamping forces to be imposed on a pipe of a specified outside diameter with the attachment surfaces of the two bars positioned against one another about the pipe.

In a third separate aspect of the present invention, the sway brace clamp includes each of the centers of curvature lying substantially in the common attachment plane which is offset away from the respective defining arcuate section across the common attachment plane thereof when the bar is unstressed.

In a fourth separate aspect of the present invention, the sway brace clamp having centers of curvature of the arcuate sections which are substantially co-incident is associated with a rigid link to define a sway brace assembly.

In a fifth separate aspect of the present invention, any of the foregoing separate aspects are contemplated to be employed together to further advantage.

Accordingly, it is an object of the present invention to provide an improved sway brace clamp. Other and further objects and advantages will appear hereinafter.

DETAILED DESCRIPTION OF THE PREFERRED EMBODIMENT

Figure 1:
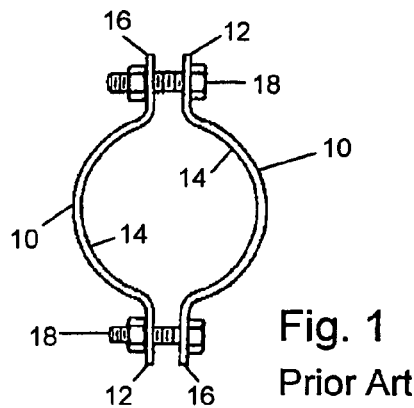
FIG. 1 is a plan view of a prior art pipe clamp.
Figure 2:
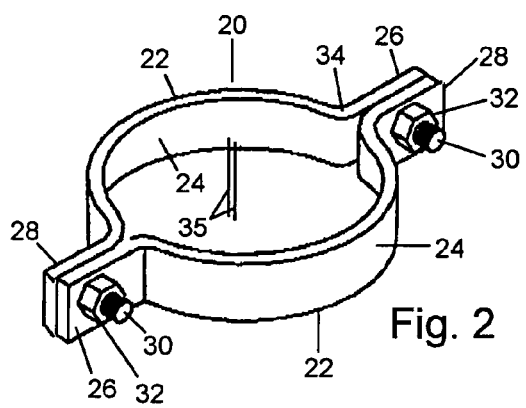
FIG. 2 is a perspective view of a sway brace clamp.
Figure 4:
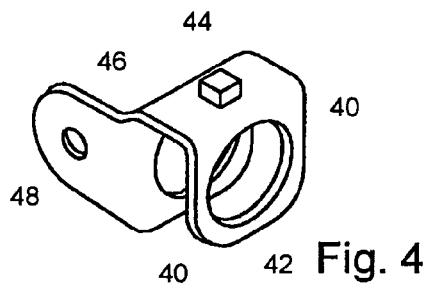
FIG. 4 is a perspective view of a straight bracket employed with the sway brace assembly of FIG. 3.

Turning in detail to the Figures, FIG. 2 illustrates a sway brace clamp. The clamp, generally designated 20, is defined by two elongate and formed bars 22. Each bar 22 includes an arcuate section 24, a first straight section 26 and a second straight section 28. Each of the straight sections 26 and 28 of each of the elongate bars 22 includes a through hole (hidden). When the elongate bars 22 are placed together as illustrated in FIG. 2, fasteners, which are illustrated in this embodiment as bolts 30 and nuts 32 threaded thereon, retain the bars 22 together.

The profile of the elongate bars 22 are arranged to provide a specific result. Utility piping used in construction typically come in specified sizes having specific outside diameters and mill tolerances, as discussed in the Background of the Invention. The arcuate sections 24 of the bars 22 are designed to be substantially hemicylindrical when assembled around a pipe of specified size with the first and second straight sections 24, 26 brought together as illustrated in FIG. 2. The arcuate sections 24 deviate from hemicylindrical elements in this state by having short radiused sections 34 to appropriately transition from the arcuate sections 24 to the straight sections 26, 28. In place, each arcuate section 24 has a center of curvature which is substantially co-incident with the center of curvature of the other arcuate section 24. In this assembly about a pipe of specified size, designed clamping forces are imposed on the pipe by the assembled bars 22 which put a strain on the bars 22 as well.

The straight sections 26, 28 each define an attachment surface on one side of the section. The attachment surfaces are on the side of the sections 24, 26 which face away from the concavity of the associated arcuate section 24. As such, they lie in common attachment planes on the two bars 22. When brought together such that the attachment surfaces touch, the common attachment planes of the two bars 22 become coincident.

To effect pre-determined positive clamping forces of the sway brace clamp 20 about a pipe with the attachment planes coincident, the centers of curvature of the arcuate sections 24 in a relaxed state are each found to lie substantially in the associated common attachment planes. Although lying substantially in the attachment plane, the center of curvature is slightly offset therefrom for drawing compression on the pipe. The direction and magnitude of the offset to retain this clamping depends on the geometry of the arcuate section 24.

The arcuate section 24 can have a radius of curvature which is equal to the nominal size of the pipe, or slightly greater than the pipe for clearance. In this instance, the offset of the center of curvature is beyond the common attachment plane for each bar 22 to maintain clamping force, and more so as clearance increases.

If the radius of curvature for the arcuate section 24 is smaller than the nominal size of the pipe, the arcuate section 24 will need to be forced to engage the pipe in interference fit even before application of the fasteners or through the fasteners being used to draw the bar 22 onto the pipe. The center of curvature in this circumstance will continue to be beyond the common attachment plane to draw the desired clamping force for acceptable interference fits between the pipe and the arcuate section 24. If the radius of curvature of the arcuate section 24 is much smaller than the pipe, the center of curvature will move across the attachment plane. However, such disparity between the arcuate section 24 and the pipe is not as preferred.

Mathematically, the maximum distance perpendicular to the attachment plane between the attachment plane and the concave side of the arcuate section 24 for each elongate bar 22 is less than the nominal outside radius minus the negative radial mill tolerance of the pipe of specified outside diameter when the bar 22 is unstressed. When the clamp 20 is assembled, this configuration provides a designed clamping force imposed on the pipe of specified outside diameter. The attachment surfaces of the two bars 22 positioned in this configuration are against one another. The designed clamping force will vary to a certain extent depending on variations in the pipe and in the clamp within mill specs.

Thus, without stressing these components, as seen in FIG. 2 without a pipe being clamped within the clamp 20, the centers of curvature 35 would be a small distance apart with each being closer to the arcuate section 24 of the other bar 22. However, as the sway brace clamp 20 is tightened about a pipe of specified outside diameter, the interference between the clamp 20 and the pipe will result in the tensioning of the bars 22 resulting in compression of the clamp 20 about the pipe as the attachment surfaces come together. In this circumstance, the arcuate sections 24 are somewhat deformed such that the centers of curvature of the two sections 24 approach coincidence. As such, a tight grip on the pipe can be achieved by the clamp 20 with the attachment surfaces of the straight sections 26, 28 against one another. The compression of the clamp 20 about the pipe can be duplicated within a predictable range.

For a four inch steel pipe, the nominal is 4.00" i.d. and 4.50" o.d. The mill tolerance is typically ±010" measured on the nominal 4.50" diameter. Therefore, the negative diametrical mill tolerance is 0.010" o.d. and the negative radial mill tolerance is 0.005" o.d. Each bar 22 has an arcuate section 24 having a radius i.d. of less than the nominal radius of the pipe o.d. minus the negative radial mill tolerance of the pipe o.d., (4.50"/2)−(0.010"/2)<2.245". To insure clamping, the tolerance on the nominal radius i.d. of the arcuate section 22 is preferably +0.000"−0.005". For normal applications for the four inch steel pipe, the nominal radius i.d. for the arcuate section 24 might appropriately be 2.240" to obtain compression even on the smallest diameter pipe within spec. The two clamps 20 together thus have a diameter i.d. of 4.480" which is 0.020" under the nominal pipe o.d. and 0.010" under the minimum in-spec pipe o.d. The short radiused section between the arcuate section 24 and each of the straight sections 26, 28 has a nominal radius of 0.50". There is a center to center distance between through holes of approximately 7.05", an overall width of the clamp 20 of 8.50" and a bar of ¼"×1¼". The bolts are ½".

Figure 3:
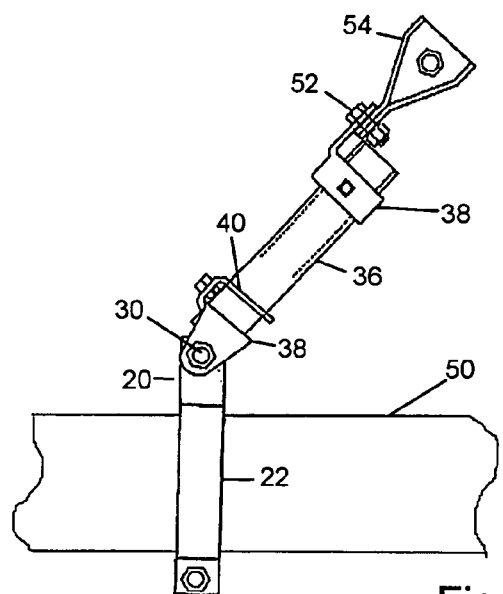
FIG. 3 is a side assembly view of a sway brace assembly with the sway brace clamp of FIG. 2.

One example of a known sway brace assembly is illustrated in FIG. 3 with the novel sway brace clamp 20 of FIG. 2. A pipe 36 includes two attachments 38, one at each end, to define a rigid link. The attachments 38 are known devices having parallel lugs 40 with mutually aligned holes 42 through the lugs 40. The holes 42 receive the pipe 36. A set screw 44 is tightened against the pipe 36 when the pipe 36 is properly placed in the holes 42 to retain the attachment 38 in place. A tab 46 with a mounting hole 48 therethrough extends parallel to the axis of the holes 42 to provide a pivotal attachment point.

The pipe 36 with the two attachments 38 define a rigid sway brace link. One attachment 38 is shown to be associated with the clamp 20 by having the bolt 30 and nut 32 of one of the fasteners also affix the tab 46 through the mounting hole 48. The tab 46 is positioned to the outside of one of the straight sections 26, 28. The straight sections 26, 28 on the clamp 20 may be configured to have one attachment end of the clamp 20 longer than the other to provide adequate clearance for the sway brace to attach and swivel. A utility pipe 50 is shown positioned in the clamp 20 in FIG. 3. The mounting tab 46 is associated through another fastener 52 with a mounting bracket 54. The mounting bracket 54 is shown to be mounted about an axis which is perpendicular to the axis of the fastener 52. In this way, appropriate adjustment can be easily accomplished.

Thus, an improved sway brace clamp has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A sway brace clamp for clamping about specified outside diameter having a nominal outside radius and a negative radial mill tolerance, comprising two elongate bars, each elongate bar including an arcuate section having a concave side, a first straight section on one end of the arcuate section and a second straight section on the other end of the arcuate section, the first and second straight sections defining attachment surfaces on one side lying in a common attachment plane, each straight section having a through hole;

fasteners extendable through the through holes to retain the two elongate bars together with the attachment surfaces of the first straight sections against the attachment surfaces of the second straight sections, respectively, a maximum distance perpendicular to the attachment plane between the attachment plane and the concave side of the arcuate section for each elongate bar being less than the nominal outside radius minus the negative radial mill tolerance when the bar is unstressed to provide a designed clamping force imposed on the specified outside diameter with the attachment surfaces of the two bars positioned against one another, respectively, each of the arcuate sections of the two elongate bars defining a center of curvature which lies substantially in the common attachment plane of the respective bar with the attachment surfaces of the first straight sections against the attachment surfaces of the second straight sections, respectively, and with each of the arcuate sections stressed and deformed about the specified outside diameter, each of the centers of curvature lying substantially in the common attachment plane being offset away from the respective defining arcuate section across the common attachment plane thereof when the bar is unstressed.

2. The sway brace clamp of claim 1, a maximum distance is 0005" less than the nominal outside radius minus the negative radial mill tolerance.

3. The sway brace clamp of claim 1, the fasteners each being a bolt with a nut threadable thereon.

4. The sway brace clamp of claim 1 further comprising short radiused sections attaching the ends of the arcuate sections to the straight sections.

5. A sway brace assembly for a specified outside diameter having a nominal outside radius and a negative radial mill tolerance, comprising a rigid link including two attachments displaced from one another;

two elongate bars, each elongate bar including an arcuate section having two ends, a first straight section on one end of the arcuate section and a second straight section on the other end of the arcuate section, the first and second straight sections defining attachment surfaces on one side lying in a common attachment plane, each straight section having a through hole;

fasteners extendable through the through holes to retain the two elongate bars together with the attachment surfaces of the first straight sections against the attachment surfaces of the second straight sections, respectively, a maximum distance perpendicular to the attachment plane between the attachment plane and the concave side of the arcuate section for each elongate bar being less than the nominal outside radius minus one-half the mill tolerance when the bar is unstressed to provide a designed clamping force imposed on the specified outside diameter with the attachment surfaces of the two bars positioned against one another, one of the two attachments being engageable with one of the fasteners with the one fastener extending through the through holes of one of the first straight sections and one of the second straight sections the attachment surfaces of which being against one another, each of the arcuate sections of the two elongate bars defining a center of curvature which lies substantially in the common attachment plane of the respective bar when clamped about the nominal outside radius minus one-half the mill tolerance with the attachment surfaces of the first straight sections against the attachment surfaces of the second straight sections, respectively, each of the centers of curvature lying substantially in the common attachment plane being offset away from the respective defining arcuate section across the common attachment plane thereof when the bar is unstressed.

6. The sway brace assembly of claim 5, a maximum distance is 0.005" less than the nominal outside radius minus the negative radial mill tolerance, the fasteners each being a bolt with a nut threadable thereon.

7. The sway brace assembly of claim 5, the fasteners each being a bolt with a nut threadable thereon.

8. The sway brace clamp of claim 5 further comprising short radiused sections attaching the ends of the arcuate sections to the straight sections.

9. The sway brace clamp of claim 1 further comprising a pipe of specified outside diameter having a nominal outside radius and a negative radial mill tolerance.

10. The sway brace assembly of claim 5 further comprising a pipe of specified outside diameter having a nominal outside radius and a negative radial mill tolerance.

* * * * *

UNITED STATES PATENT AND TRADEMARK OFFICE
CERTIFICATE OF CORRECTION

PATENT NO.        : 7,140,579 B2
APPLICATION NO. : 10/829463
DATED             : November 28, 2006
INVENTOR(S)       : Kirschner It is certified that error appears in the above-identified patent and that said Letters Patent is hereby corrected as shown below:

(Col. 5, Line 37), delete "0005" insert -- 0.005 -- therefor.

Signed and Sealed this

Twentieth Day of February, 2007

JON W. DUDAS
*Director of the United States Patent and Trademark Office*